United States Patent [19]

Jha et al.

[11] 4,110,400
[45] Aug. 29, 1978

[54] SELECTIVE PRECIPITATION OF NICKEL AND COBALT SULFIDES FROM ACIDIC SULFATE SOLUTION

[75] Inventors: Mahesh C. Jha, Arvada; Gordon R. Wicker, Lakewood; Gustavo A. Meyer, Arvada, all of Colo.

[73] Assignee: Amax Inc., Greenwich, Conn.

[21] Appl. No.: 820,595

[22] Filed: Aug. 1, 1977

[51] Int. Cl.$^2$ .............................................. C01G 53/00
[52] U.S. Cl. ................................... 423/141; 423/566
[58] Field of Search ........... 423/140, 141, 142, 561 R, 423/150, 566; 75/108, 115, 119

[56] References Cited

U.S. PATENT DOCUMENTS

| | | | |
|---|---|---|---|
| 2,020,325 | 11/1935 | Myhren | 423/566 |
| 2,872,306 | 2/1959 | Morrow | 423/140 |
| 3,367,740 | 2/1968 | Zubryckyj et al. | 423/150 |
| 3,991,159 | 11/1976 | Queneau et al. | 423/141 |
| 4,024,218 | 5/1977 | McKay et al. | 423/150 |

OTHER PUBLICATIONS

Wadsworth; M. et al., Editors, *Unit Processes in Hydrometallurgy*, Gordon and Breach, Science Publishers, N.Y., 1964, pp. 600–608.
Boldt et al., Editors, *The Winning of Nickel*, Longmans Canada Ltd., Toronto, 1967, pp. 437–449.

*Primary Examiner*—Brian Hearn
*Attorney, Agent, or Firm*—Michael A. Ciomek; Eugene J. Kalil

[57] ABSTRACT

A method for efficiently precipitating nickel sulfide from an acidic nickel sulfate solution having a pH between 1.5 and 4, containing about 1 to 40 gpl nickel, optionally containing cobalt, and containing sufficient inert soluble sulfate salt to buffer the solution during the precipitation of nickel sulfide at relatively low temperature and pressure.

17 Claims, 2 Drawing Figures

SELECTIVE PRECIPITATION OF NICKEL AND COBALT SULFIDES FROM ACIDIC SULFATE SOLUTION

This invention relates to the precipitation of nickel and cobalt as sulfides from sulfate solutions, such as dilute solutions obtained in the hydrometallurgical recovery of nickel and cobalt from lateritic ores.

STATE OF THE ART

Precipitation of nickel and cobalt as sulfides from either ammoniacal or acidic leach solutions is a commonly used commercial method. The Moa Bay plant in Cuba is one of the few commercial operations where nickel and cobalt are precipitated from acidic leach solutions. Briefly, the process consists of neutralizing the leach liquor (pressure leaching of lateritic ores with sulfuric acid) with lime (coral mud) and decanting the neutralized liquor which is then treated with hydrogen sulfide gas. The sulfide precipitation is carried out in a series of high pressure autoclaves at a temperature of about 120° C and a total pressure of about 150 psig. A choke controls the flow of the slurry from a high pressure autoclave to a flash tank. A large amount of $H_2S$ gas is dissolved in the solution at the high pressure prevalent in the autoclaves and is released in the flash tank. This released gas, which is several times the amount actually consumed during precipitation, is washed, dried and compressed by a compressor to high pressure prior to its recycle to the autoclaves. The slurry from the flash tank goes to a solid/liquid separation step (thickener). About two-thirds of the nickel sulfide leaving the reactor is returned back to the process for recycling and the remaining one-third leaves as the product concentrates. The amount of solid recycle is proportioned to give about 20 gpl solids in the feed slurry.

The Moa Bay acid leaching process is disclosed in an article entitled "Acid Leaching Moa Bay-Nickel" by E. T. Carlson and C. S. Simons (Journal of Metals, March, 1960, pps. 206–213).

Another sulfide precipitation method is disclosed in U.S. Pat. No. 2,722,480 (Nov. 1, 1955). The method is particularly applicable in the treatment of nickel solutions resulting from the leaching of lateritic ore, such solutions generally containing 3 to 13 grams per liter (gpl) of nickel, 0.2 to 0.7 gpl Co, 0.5 to 2.0 gpl $Fe^{++}$, 2 to 8 gpl Al, 1 to 5 gpl Mn, 0.5 to 2.0 gpl Mg and about 15 to 30 gpl $H_2SO_4$. The method comprises adjusting the free acid content of the solution to a pH of about 1 to 3, adding to the adjusted solution about 0.03 to about 10 gpl of finely divided metallic powder selected from the group consisting of Fe, Ni and Co and mixtures thereof, confining the solution at a temperature of about 60° C to 90° C under a positive overpressure of hydrogen sulfide gas and continuing the treatment with agitation until sulfide precipitation substantially ceases. According to the patent, substantially all of the nickel (e.g. 98 to 99%) is precipitated by this method in about 1 to 2 hours.

The disadvantages of the Moa Bay process are as follows:

The high temperature employed (above the boiling point of water) needs considerable amounts of heat energy and, with increasing energy shortage throughout the world, this may become a major drawback. A high pressure of 150 psig (total) in the autoclaves necessitates high capital cost for the process: for feed pumps, for high alloy autoclaves, agitator seals and chokes. The high pressure in the vessels causes a large amount of $H_2S$ gas to be dissolved in the solution, the amount being several times more than the actual stoichiometric amount required for precipitating nickel and cobalt.

To recover the excessive amounts of $H_2S$ released in the flash tank and to recycle it to the process at 150 psig requires an expensive set-up. The released gas is washed, dried and then compressed. At high temperature and pressure, most of the precipitation takes place by a homogeneous liquid phase reaction, thus generating a lot of fines. Also, high temperature causes precipitation of aluminum and iron thus resulting in a contaminated product.

Under the operating conditions of the Moa Bay process (high temperature, high $H_2S$ pressure and only about 20 gpl solids in the feed slurry), a large amount of precipitation takes place on the autoclave walls. This severe scaling necessitates the use of four precipitation trains out of which three operate at any given time while the fourth one is being descaled. High temperature and pressure cause severe corrosion and maintenance problems. From a safety point of view, hydrogen sulfide gas at high pressure is more undesirable than at low pressure.

With regard to the process disclosed in the previously discussed U.S. Pat. No. 2,722,480, a major drawback of this process is the necessity of using metallic fines (Fe, Ni and Co) as catalysts in concentrations as high as 10 gpl. This represents about 10 to 100% of the amount of nickel to be precipitated. The use of metal powders adds significantly to the cost and the resultant impurities (e.g. iron) present a refining problem which can be expensive. Also, the powder catalyst will react with the free acid present and thus raise the pH of the solution to fairly high values. While this will give good precipitation rates, slimy precipitates tend to form which may cause severe scaling problems.

OBJECTS OF THE INVENTION

An object of the present invention is to develop an efficient and economical process for the recovery of nickel and cobalt from dilute acidic solutions obtained by the sulfuric acid leaching of nickel-bearing ores, ocean nodules, alloy scrap or any such material. In addition to nickel and/or cobalt, the solutions may contain significant amounts of iron, aluminum, chromium, manganese and magnesium.

Another object is to provide a low-pressure, low-temperature process for the efficient precipitation of nickel sulfide in which the nickel in solution is substantially completely precipitated in a fairly short time.

BRIEF DESCRIPTION OF THE DRAWINGS

These and other objects will more clearly appear when taken in conjunction with the following disclosure and the accompanying drawing, wherein.

THE INVENTION

Figure 1:
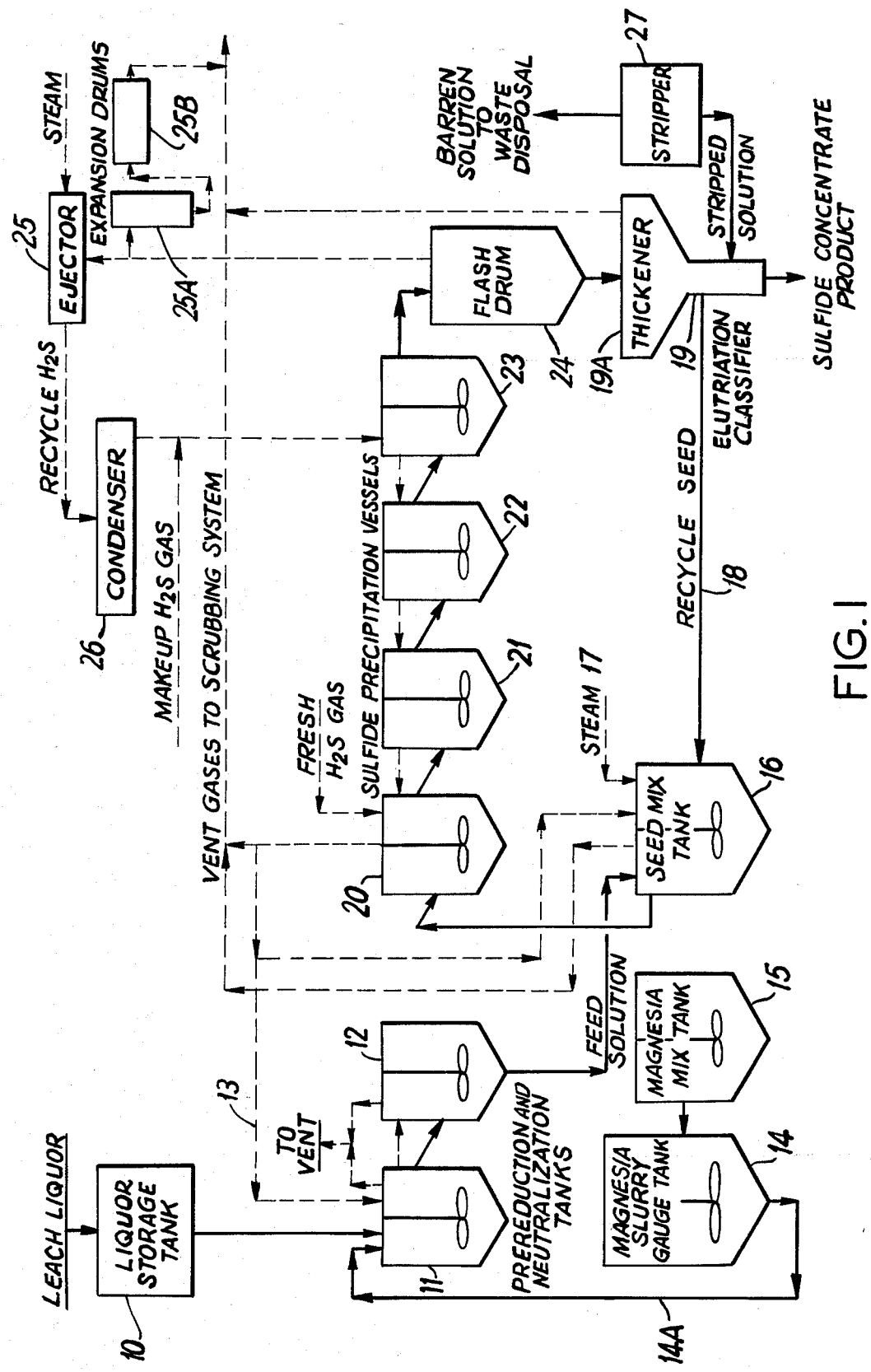
FIG. 1 is a flow sheet illustrating a continuous process for carrying out the invention.

One embodiment of the invention resides in a method of efficiently precipitating nickel as nickel sulfide from a nickel sulfate solution containing about 1 to 40 gpl of nickel, for example, 3 to 15 gpl nickel, and optionally, cobalt. In its broad aspects, the method comprises providing said solution at a pH ranging from about 1.5 to 4 containing a soluble inert sulfate salt, e.g. magnesium sulfate, to provide sulfate ions as an acid buffer to combine with hydrogen ions formed during the precipitation of nickel. The reaction of the sulfate ions with hydrogen ions forms $HSO_4^{-1}$. If the solution has a pH below 1.5, the solution is then neutralized to a pH of about 1.5 to 4 by adding a neutralizing agent that forms a soluble inert sulfate salt by reaction with free sulfuric acid in said solution, the inert sulfate providing sulfate ions in said solution, the sulfate ion formed behaving as an acid buffer by combining with hydrogen ions formed during the precipitation of nickel sulfide to form $HSO_4^{-1}$. A slurry of finely divided nickel sulfide is then added to the buffered solution to provide a seed concentration of at least 75 gpl, following which the solution is subjected to sulfide precipitation with $H_2S$ under low pressure at a temperature of about 65° C to less than about 100° C while vigorously agitating said solution until substantially complete sulfide precipitation obtains.

DETAILS OF THE INVENTION

The invention overcomes the disadvantages of the Moa Bay Process in that it operates at low temperatures (less than 100° C) and low pressure ranging from 5 to 50 psig and generally 10 to 15 or 25 psig. High precipitation efficiencies are obtained at pH's employed in practice, such as 2.5, with low nickel concentrations, such as 3 to 5 gpl, although the nickel concentration may range from 3 to 15 gpl, or even 1 to 40 gpl, with cobalt ranging up to 5 gpl, e.g. 1 or 2 gpl.

Such precipitation efficiencies are obtainable over a relatively short time period of 10 to 15 minutes in a batch reactor or about 30 to 40 minutes in a continuous operation. In general, the complete reaction occurs in less than one hour.

The foregoing high efficiency is achieved by improving the thermodynamics and kinetics of the precipitation process as represented by the following reaction:

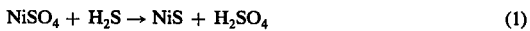

$$NiSO_4 + H_2S \rightarrow NiS + H_2SO_4 \quad (1)$$

The improvement in thermodynamics is obtained by a buffering reaction while the improvement in kinetics is obtained by providing a large amount of seed recycle and vigorous agitation as disclosed hereinafter.

THERMODYNAMICS OF THE REACTION

As is predictable from (1) above, sulfuric acid is generated when nickel is precipitated as sulfide using hydrogen sulfide gas. The build-up of acid rapidly increases the $H^+$ ion concentration in the solution (or decreases the pH of the solution), which tends to stop the precipitation process at a high value of residual $Ni^{++}$ ion concentration in solution. To bring this nickel concentration level down to say below 50 ppm, the old process made use of higher $H_2S$ pressure going up to as high as 135 psig of $H_2S$ pressure. The present invention makes use of the fact that part of the $H^+$ ion generated during precipitation can be made to form $HSO_4^{-1}$ ion according to the following reaction:

$$H^{+1} + SO_4^{-2} \rightarrow HSO_4^{-1} \quad (2)$$

To accomplish this buffering action, the solution should have a reasonable level of sulfate ion concentration, particularly the presence of inert metal sulfates which do not precipitate at the temperatures of the reaction and which do not react with hydrogen sulfide gas.

In the case of solutions obtained by leaching nickel bearing ores, this is easily accomplished by using a magnesium oxide-containing ore rather than lime for neutralizing the leach liquor. While the former gives soluble $MgSO_4$ as the neutralization product, the latter gives insoluble gypsum which has to be removed from the system. Because of the use of lime (coral mud) in Moa Bay practice, the sulfate concentration in the solution decreases from 47 gpl to 27 gpl during neutralization prior to the sulfide precipitation step. If MgO (or MgO-containing ore) is used for neutralization as suggested by U.S. Pat. No. 3,991,159, the sulfate concentration of the inert salt in the feed solution will range as high as 50 gpl or more. The beneficial effect of the buffering action provided by $MgSO_4$ will be apparent from Example 1. Other inert soluble sulfates will provide similar effects.

KINETICS OF THE REACTION

It is well known that the solubility product of NiS is very small and is smaller at lower temperatures than at higher temperatures. Also, the solubility of $H_2S$ gas (at any given pressure) in a given solution increases with decreasing temperature. The dissociation of dissolved $H_2S$ into $HS^{-1}$ and $S^{-2}$ ions (at any given pH) increases with increasing temperature. To sum up, the thermodynamics of the precipitation reaction (Eq. 1) is as good at lower temperatures as at higher temperatures.

The reason why heretofore nickel could not be precipitated quantitatively at lower temperatures is because of kinetics. For this purpose, the precipitation of nickel sulfide can be compared to a crystallization process. $Ni^{+2}$ and $HS^{-1}$ or $S^{-2}$ ions present in the solution have to meet and react to form a solid product. At high temperatures and high reactant concentrations (exceeding saturation), homogeneous reaction between the two ions takes place, resulting in extremely rapid precipitation of very fine particles. At low temperatures and low $H_2S$ pressures, this homogeneous reaction cannot take place. However, if a solid surface is introduced into the system, a slow heterogeneous reaction can be made to take place. This is illustrated by Example 2 herein.

Once it was realized that the precipitation could be started by a heterogeneous reaction on solid surfaces, such as nickel sulfide seed, the invention was directed towards improving the rate of the heterogeneous reaction so that about 99% nickel precipitation efficiencies could be obtained in 10 to 15 minutes in a batch reactor or in 30 to 40 minutes in a continuous reactor. We discovered that this object can be accomplished by providing a very large amount of solid surface (100 to 200 gpl seed concentration) and by providing vigorous agitation. The invention illustrates that the process can work in a range of temperature and pressure below 90° C and 15 psig, respectively,

INITIAL PH AND PH CONTROL

The process was developed basically for feed solutions neutralized to initial pH of about 2 which is lower than the value of 2.5 used in the old practice. However, the process has been shown to work on any solution in the pH range of 1.5 to 4. As will be noted hereinafter, higher feed pH tends to give better nickel precipitation efficiency.

If the amount of nickel to be precipitated is very high (say 10 gpl or above), the final pH may drop too low to get the nickel concentration down to a level in solution of 50 ppm or below. Under these conditions, in situ neutralization, by injecting controlled amounts of MgO slurry into precipitation vessels, is recommended. The effect of such neutralization on the rate and extent of precipitation of nickel will clearly appear from Example 7.

The upper limit of the pH is generally determined by two factors: (1) cost of carrying out the neutralization to a higher pH and (2) the quality of the product. Higher pH leads to a slimy precipitate and to contamination by other ions precipitating with the nickel sulfide.

In carrying the invention into practice, tests were carried out on a bench scale in a 2 liter Parr titanium autoclave. Examples 1 through 7 are the results of such batch tests. In these tests, one liter of feed solution of desired composition was mixed with predetermined amounts of solid sulfide concentrate and put in a glass liner. The liner was then inserted in the autoclave and the slurry heated to desired temperature under a nitrogen atmosphere. Once the temperature stabilized, the autoclave was depressurized to 0 gage pressure and then repressurized with hydrogen sulfide gas to the desired gage pressure. During the course of the test $H_2S$ was supplied as needed to maintain the desired gage pressure. The agitation was provided by two pitched blade turbine impellers and a baffle was used. A fixed stirring rate was used in each of the tests during the entire period of heating and precipitation. Samples were withdrawn at timed intervals and analyzed for nickel and cobalt concentrations by Atomic Absorption Technique.

The process has also been demonstrated by employing several continuous runs lasting for a series of days in a pilot plant treating 300 to 500 liters of solution per hour. Certain engineering features were incorporated for recycle of seed and flashed $H_2S$ gas. Successful use of a simple gas recycle system was possible because of the low pressure operation employed. FIG. 1 presents a schematic flow diagram of the process.

The feed solution is pumped from a storage tank 10 to pre-reduction and neutralization tanks 11, 12 at a controlled flow rate. A bleed stream of gas 13 from the precipitation vessel is sparged into this tank to pre-reduce ferric ions to ferrous ions. To neutralize the acid formed during pre-reduction and to further adjust the pH of the solution, if so desired, appropriate amount of MgO slurry 14A is added from tank 14, said tank being fed by magnesia mix tank 15. The solution next goes to the seed mix tank 16 where steam 17 is added to heat it to the desired temperature. Also, the sulfide fines 18 from the top portion of the elutriator 19 are brought to this tank in amounts required to maintain the desired solids (seed) content in the slurry.

The feed slurry is then pumped into the first precipitation tank 20. The four precipitation vessels 20 to 23 which form a series of continuous stirred tank reactors, have their gas caps connected. Hydrogen sulfide is introduced in the first vessel through a sparger. The agitators in the four vessels may be run at different speeds. The slurry flow from the last vessel 23 to flash tank 24 is controlled by a valve to maintain a desired liquid level in the vessels. This in turn determines the residence time. The small amount of gas released in the flash tank is sucked by a steam ejector 25 and returned to the last vessel 23 through a condenser 26. Some of the gas is bled off to seed mix tank 16. The slurry from flash tank 24 flows into a thickener 19A from where clean overflow (barren solution) goes to waste disposal through a stripper 27. The solids settling at the bottom of the thickener flow into an elutriator 19 which is kept fluidized by a small recycle stream of barren solution. The elutriator keeps the fines in the upper portion from where they are recycled to act as seed and provide a large surface area for heterogeneous precipitation. The coarse particles that are at the bottom of the elutriator are removed as the product.

As illustrative of the invention, the following examples are given.

EXAMPLE 1

To illustrate the beneficial effect of inert sulfate salts, the results of three precipitation tests are presented in Table I. These tests were performed on feed solutions neutralized to pH 2 and containing about 7 gpl nickel, about 0.4 gpl cobalt, about 4 gpl iron, about 4 gpl aluminum, about 2 gpl manganese and varying concentrations of magnesium as shown in Table 1. Test conditions were as follows: 90° C, 10 psig total pressure, 1000 rpm stirring rate, 200 gpl seed in the first test and 100 gpl seed in the other two.

Table I

Effect Of $MgSO_4$ Concentration Level On The Rate And Extent Of Precipitation Of Nickel

| Magnesium Concentration gpl | Nickel Concentration, gpl | | | | | |
|---|---|---|---|---|---|---|
| | Initial | After Different Reaction Time (minutes) | | | | |
| | | 1 | 5 | 15 | 30 | 60 |
| 3 | 7.3 | 4.1 | 1.4 | 0.31 | 0.14 | 0.11 |
| 13 | 6.9 | 0.72 | 0.11 | 0.067 | 0.057 | 0.050 |
| 20 | 6.3 | 0.55 | 0.073 | 0.049 | 0.037 | 0.032 |

It is recommended that the total inert sulfate concentration in the feed solution going to the precipitation step be in the range of about 30 to 400 gpl.

It is seen from Table I that about 99% of the nickel can be precipitated from feed solutions containing about 7 gpl nickel and 13 to 20 gpl magnesium. These compositions are typical of pregnant solutions obtained by leaching nickel-bearing oxide ores (laterites) containing both limonite and serpentine fractions or when MgO or MgO-containing ore is used for neutralization.

EXAMPLE 2

To prove the necessity of providing seed surface for starting precipitation by heterogeneous reaction, and the advantage of having larger seed concentration, a series of three precipitation tests were conducted at 90° C and 10 psig total pressure. The feed solution for these tests had pH and cobalt, aluminum, iron and manganese concentrations similar to that described in Example 1. Magnesium concentration was about 3 gpl and a stirring rate of 500 rpm was used.

TABLE II

Heterogeneous Vs. Homogeneous Reaction For Precipitation Of Nickel Sulfide At 90° C and 10 psig Total Pressure

| Magnesium Concentration, gpl | Nickel Concentration, gpl | | | | | |
|---|---|---|---|---|---|---|
| | Initial | After Different Reaction Time (minutes) | | | | |
| | | 1 | 5 | 15 | 30 | 60 |
| 0 | 7.2 | 7.4 | 7.3 | 7.1 | 7.1 | — |
| 10 | 7.2 | 5.4 | 1.9 | 0.88 | 0.25 | 0.25 |
| 100 | 7.2 | 1.5 | 0.36 | 0.26 | 0.20 | — |

The results presented in Table II show that a homogeneous reaction does not readily take place at 90° C and 10 psig total pressure. It is also evident that larger seed concentrations provide better results. However, with this type of feed solution (3 gpl magnesium and pH 2), and at this agitation level (500 rpm), nickel concentration could not be brought down below 200 ppm level even with 100 gpl seed, unless higher amounts of magnesium are employed, such as 7.5 gpl and above.

EXAMPLE 3

To illustrate further the importance of seed concentration, and to demonstrate that 99% precipitation efficiencies are readily obtainable at larger seed concentrations, a series of four tests were performed on a feed solution that was similar in composition to that described in Examples 1 and 2, except for the fact that magnesium concentration was 13 gpl. An agitation rate of 1000 rpm was used in these tests performed at 90° C and 10 psig total pressure. The results are presented in Table III. These results very clearly suggest that, while the precipitation reaction can be made to start at low seed concentration levels (25 to 50 gpl), the seed concentration should be in the 100 to 200 gpl range in order to attain 99% precipitation efficiency in 10 to 15 minutes reaction time. Generally speaking, the seed concentration should be at least about 75 gpl and may range as high as 300 gpl.

TABLE III

Effect Of Seed Concentration On The Rate and Extent Of Precipitation Of Nickel

| Magnesium Concentration, gpl | Nickel Concentration, gpl | | | | | |
|---|---|---|---|---|---|---|
| | Initial | After Different Reaction Time (minutes) | | | | |
| | | 1 | 5 | 15 | 30 | 60 |
| 25 | 6.9 | 2.0 | 0.33 | 0.24 | 0.25 | 0.25 |
| 50 | 6.9 | 0.62 | 0.16 | 0.13 | 0.12 | 0.11 |
| 150 | 6.9 | 0.33 | 0.085 | 0.062 | 0.056 | 0.055 |
| 250 | 6.9 | 0.57 | 0.092 | 0.062 | 0.046 | — |

EXAMPLE 4

In feed solutions containing 13 gpl magnesium and 100 gpl seed, 99% precipitation efficiency is not always attainable in 10 to 15 minutes reaction time unless vigorous agitation is provided to improve mass transfer rate in the heterogeneous reaction. This is illustrated by a set of five precipitation tests performed at 90° C and 10 psig total pressure. The feed solution was the same as used for the tests of Example 3.

The results from this set of tests are presented in Table IV and clearly show the significance of proper agitation in obtaining the desired results. It should be realized that the above stirring rates are associated with a certain geometry of the system and that the optimum agitation is to be determined for different system geometries to be used in actual practice. This is easily determined by experiment by a skilled person.

TABLE IV

Effect Of Agitation On The Rate And Extent Of Precipitation Of Nickel

| Stirring Rate RPM | Nickel Concentration, gpl | | | | | |
|---|---|---|---|---|---|---|
| | Initial | After Different Reaction Time (minutes) | | | | |
| | | 1 | 5 | 15 | 30 | 60 |
| 72 | 6.9 | 7.1 | 6.6 | 6.5 | 6.1 | 4.9 |
| 250 | 6.9 | 6.8 | 6.4 | 1.5 | 0.27 | 0.13 |
| 500 | 6.9 | 4.1 | 1.04 | 0.30 | 0.12 | 0.093 |
| 1000 | 6.9 | 0.72 | 0.11 | 0.067 | 0.057 | 0.050 |
| 1250 | 6.9 | 0.63 | 0.13 | 0.077 | 0.063 | 0.064 |

As will be noted, the nickel ion concentration can be decreased to below 100 ppm at a stirring rate of 500 rpm in less than one hour and in less than 15 minutes at a stirring rate of 1000 RPM.

EXAMPLE 5

To prove the fact that a temperature of 90° C and a total gas pressure of 10 psig was not a unique combination, several tests were performed at lower temperatures. The total pressure in the system was limited to 15 psig. Results of five such tests are presented in Table V below.

TABLE V

Precipitation Of Nickel Sulfide At Lower Temperatures

| Temperature °C | Total Pressure psig | Seed Concentration gpl | Nickel Concentration, gpl | | | | | |
|---|---|---|---|---|---|---|---|---|
| | | | Initial | After Different Reaction Time (minutes) | | | | |
| | | | | 1 | 5 | 15 | 30 | 60 |
| 75 | 15 | 200 | 5.0 | 2.0 | 0.79 | 0.10 | 0.041 | 0.026 |
| 75 | 10 | 200 | 5.0 | 0.65 | 0.22 | 0.069 | 0.042 | 0.039 |
| 60 | 15 | 100 | 5.0 | 3.5 | 2.4 | 1.4 | 0.84 | 0.34 |
| 60 | 10 | 200 | 5.0 | — | 1.2 | 0.58 | 0.25 | 0.11 |
| 40 | 15 | 200 | 5.0 | 5.0 | 4.7 | 3.1 | 2.2 | 1.3 |

The tests indicate that the temperature should be at least 65° C and range up to less than 100° C. Broadly, the pressure may range from about 5 to 50 psig and, preferably, from about 10 to 25 psig.

The feed solution used for these tests contained about 5 gpl nickel, about 0.28 gpl cobalt, about 13 gpl magnesium, about 3 gpl iron, about 3 gpl aluminum and about 1.4 gpl manganese. A stirring rate of 1250 rpm was used in all the tests.

EXAMPLE 6

The feed solution used in all the tests described in Examples 1 through 5 was at an initial neutralized pH of 2 (measured at room temperature). This is slightly lower than the value 2.5 used in old practice (commercial plant at Moa Bay). To determine the effect of feed solution pH on the rate and extent of precipitation of nickel under low temperature low pressure conditions, three tests were performed at 90° C and 10 psig total pressure. All the three tests were run with 100 gpl seed concentration and at 1250 rpm. The starting feed solution (used for the first test) was at a pH of 1.7 and was neutralized at room temperature to get higher pH values of 2.6 and 3.9 respectively for the second and third tests. The solution contained about 5 gpl nickel, about 0.25 gpl cobalt, about 11 gpl magnesium, about 3 gpl iron, about 2.8 gpl aluminum and about 1.1 gpl manganese.

TABLE VI

Effect Of Feed Solution pH On The Rate And Extent Of Precipitation Of Nickel

| Feed Solution pH | Nickel Concentration, gpl | | | | | |
|---|---|---|---|---|---|---|
| | Initial | After Different Reaction Time (minutes) | | | | |
| | | 1 | 5 | 15 | 30 | 60 |
| 1.7 | 5.0 | 0.20 | 0.090 | 0.079 | 0.070 | 0.066 |

TABLE VI-continued

Effect Of Feed Solution pH On The Rate And Extent Of Precipitation Of Nickel

| Feed Solution pH | Nickel Concentration, gpl | | | | |
|---|---|---|---|---|---|
| | Initial | After Different Reaction Time (minutes) | | | |
| | | 1 | 5 | 15 | 30 | 60 |
| 2.6 | 5.0 | 0.24 | 0.052 | 0.031 | 0.028 | 0.028 |
| 3.9 | 5.0 | 0.058 | 0.025 | 0.024 | 0.023 | — |

Table VI clearly shows that higher initial pH not only gives a lower final nickel concentration level to below 100 ppm, but also cuts down considerably the time required to reach 99% precipitation efficiency. As will be noted, nickel concentration below 50 ppm is also obtainable.

EXAMPLE 7

Another possibility for improving the rate and extent of precipitation of nickel is by in situ neutralization during precipitation. As was seen from Examples 1 through 6, even under less favorable conditions, a major portion of the nickel is precipitated during the first five minutes. This of course generates an equivalent amount of acid according to Reaction 1, which in turn slows down the rate of precipitation in later stages. If this acid is neutralized, even partly, during the precipitation, the total nickel precipitation efficiency can be considerably improved. The neutralizing agent has to be such that it does not form an insoluble product. Also, it should react completely and quickly with the acid. These considerations are important in order to avoid the contamination of the product. MgO slurry was used in the tests, but $Mg(OH)_2$, ammonia or other alkali metal hydroxides or oxides can be used for this purpose so long as the inert sulfate salt is soluble.

Figure 2:
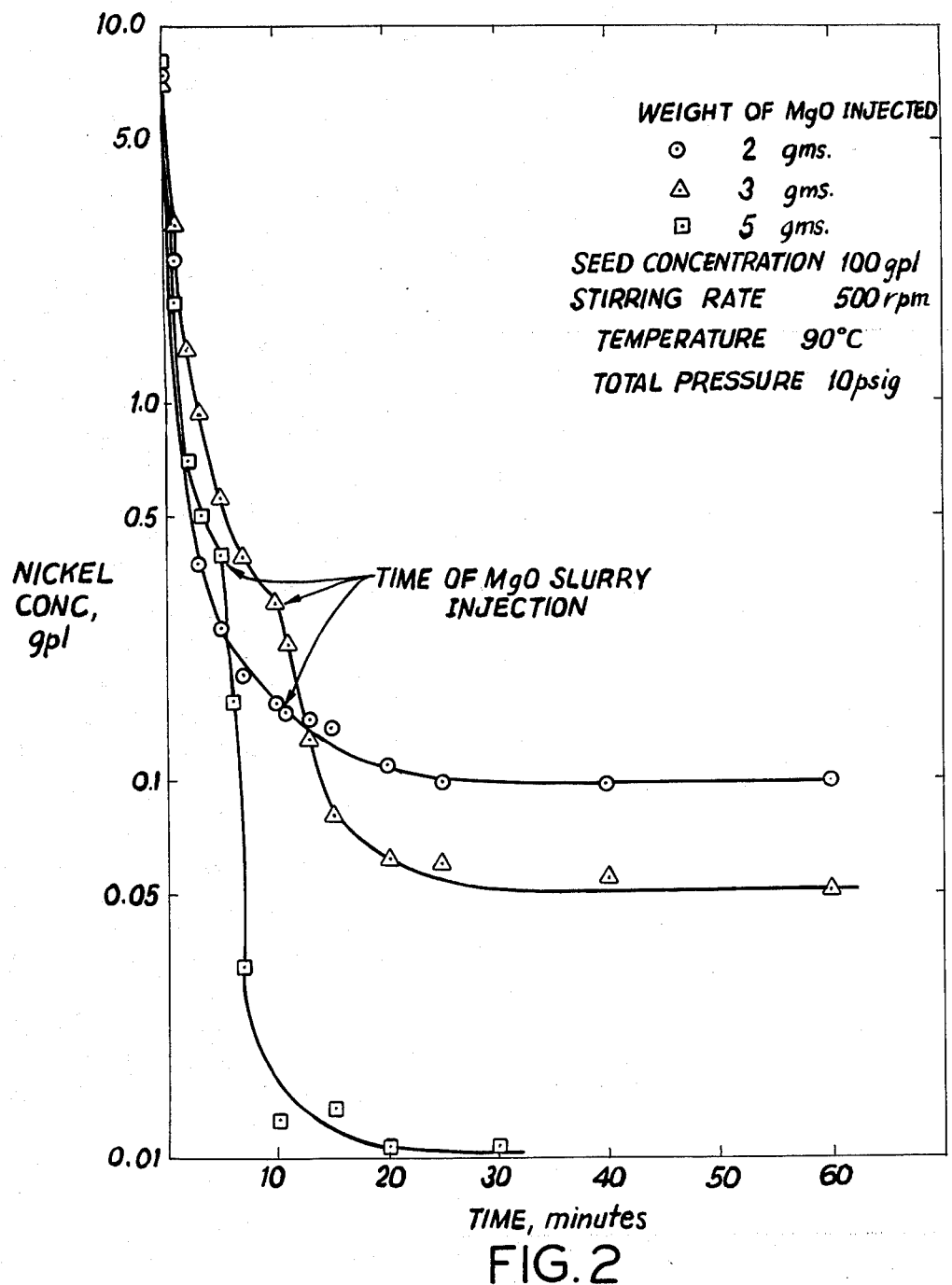
FIG. 2 is a graph showing the effect of the addition of MgO as a neutralize for controlling the solution pH and thereby for controlling the precipitation of nickel from solution as nickel sulfide.

FIG. 2 shows the results of three tests performed with this objective. The feed solution was the same as used in tests described in Example 1 and contained only about 3 gpl magnesium. Other test conditions were: 90° C, 10 psig total pressure, 100 gpl seed concentration and 500 rpm stirring rate. The effect is not very apparent in the first test in which the amount of MgO added was rather small. The effect became dramatic as the amount of MgO was increased. The exact amount to be added has to be determined based on the composition of the feed solution particularly its pH and nickel and magnesium concentrations. As excessive amount will be undesirable not only from the cost point of view but also from the product quality point of view. Higher pH will lead to a more slimy and more contaminated product.

EXAMPLE 8

A continuous process for the precipitation of nickel sulfide has been demonstrated on a pilot plant scale. The starting leach liquor had a pH of 1.13 and contained 3.7 gpl nickel. The concentration of the other elements is shown in Table VII. In the neutralization section of the plant (FIG. 1), the pH was raised to 2.36 by mixing MgO slurry at 60° C. The major process variables were controlled at the following values: the temperature at 88° C, the total gas pressure at 1 $Kg/cm^2$ gage (14.9 psig), seed concentration at 100 gpl, stirring rate at 600 rpm and a nominal residence time of 48 minutes employed. Under these conditions, 99.3% of nickel was precipitated as a sulfide concentrate. The composition of the concentrate is presented in Table VII, which shows the selectivity of the precipitation process. During the steady state operation, the average nickel concentration in the four precipitation vessels was found to be: 1.6 gpl, 0.18 gpl, 0.037 gpl and 0.018 gpl, respectively.

TABLE VII

Typical Composition Of The Feed Solution And Product Concentrate, Showing The Selectivity Of The Precipitation Process

| Element | Concentration in Solution, gpl | Wt % in Concentrate |
|---|---|---|
| Nickel | 3.7 | 55.2 |
| Cobalt | 0.27 | 3.8 |
| Iron | 1.2 | 0.78 |
| Aluminum | 0.8 | 0.001 |
| Manganese | 1.7 | 0.005 |
| Magnesium | 5.7 | 0.005 |
| Sulfur | — | 35.6 |

EXAMPLE 9

In all the examples given hereinbefore, the nickel concentration in the feed solution was in the range of 4 to 7 gpl. This concentration is typical of liquors obtained by leaching low grade laterites. However, if rich ores are leached (e.g. garnierites with more than 2% nickel), or solutions are obtained from some other source, nickel concentration may be higher. To demonstrate the applicability of the present process to high nickel solutions, a pilot plant run was made on a feed solution containing 15 gpl nickel, 46 gpl magnesium, 0.34 gpl cobalt, 0.5 gpl iron, 0.4 gpl aluminum and 1.8 gpl manganese. The solution had a pH of 2.7. The nickel concentration came down to 1.3; 0.99; 0.48 and 0.24 gpl, respectively, in the four precipitation vessels. The experimental conditions were similar to that described in Example 8, except for the residence time which was 60 minutes. A batch precipitation test for two hours indicated that the nickel concentration could be brought down to 60 ppm.

While magnesium oxide-containing ores are particularly useful as neutralizing agents, it will be appreciated that other metal oxide ores can be used which provide a soluble inert sulfate salt as a neutralization product, such as ores containing iron oxide.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of efficiently precipitating nickel as nickel sulfide from an acidic nickel sulfate solution containing up to 15 gpl nickel having a pH in the range of about 1.5 to 4 and a soluble inert sulfate salt which provide sulfate ions in an amount ranging from about 30 to 400 gpl as an acid buffer by combining with hydrogen ions formed during precipitation of nickel sulfide to form $HSO_4^{-1}$ which comprises, adding a slurry of finely divided nickel sulfide to said solution to provide a seed concentration of at least about 75 gpl, and then subjecting said solution to sulfide precipitation with $H_2S$ under pressure at a temperature of about 65° C to less than 100° C while vigorously agitating said solution until substantially complete sulfide precipitation of nickel obtains.

2. A method of efficiently precipitating nickel as nickel sulfide from an acidic nickel sulfate solution containing up to 15 gpl nickel which comprises:

neutralizing said solution to a pH in the range of about 1.5 to 4 by adding a neutralizing agent that forms a soluble inert sulfate salt by reaction with free acid in said solution, the inert sulfate salt providing sulfate ions in said solution in an amount ranging from about 30 to 400 gpl, the sulfate ion formed behaving as an acid buffer by combining with hydrogen ions formed during precipitation of nickel sulfide to form $HSO_4^{-1}$, adding a slurry of finely divided nickel sulfide to said solution to provide a seed concentration of at least about 75 gpl, and then subjecting said solution to sulfide precipitation with $H_2S$ under pressure at a temperature of about 65° C to less than 100° C while vigorously agitating said solution until substantially complete sulfide precipitation of nickel obtains.

3. The method of claim 2, wherein the acid pH is adjusted by adding a neutralizing agent selected from the group consisting of MgO, Mg(OH)$_2$ and alkali metal hydroxides.

4. The method of claim 2, wherein the neutralizing agent is an oxide ore which provides a soluble inert sulfate salt as a neutralization product.

5. The method of claim 4, wherein the ore is a nickel oxide ore containing magnesium oxide.

6. The method of claim 2, wherein the sulfate ion concentration is substantially directly related to the concentration of nickel in the solution.

7. The method of claim 6, wherein the $H_2S$ is added to said solution under a pressure of about 5 to 50 psig.

8. The method of claim 7, wherein the pH of said solution is adjusted over the range of about 2 to 3.5, wherein the $H_2S$ is added under a pressure of about 10 to 25 psig, and wherein the amount of nickel sulfide seed ranges from about 75 to 300 gpl.

9. A method of efficiency precipitating nickel as nickel sulfide from an acidic nickel sulfate solution containing up to 15 gpl nickel which comprises:

neutralizing said solution to a pH of about 2 to 3.5 by adding a neutralizing agent that forms a soluble inert sulfate salt by reaction with free acid in said solution, the inert sulfate salt providing sulfate ions in said solution ranging from about 30 to 400 gpl, the amount being substantially directly related to the nickel concentration, the sulfate ion formed behaving as an acid buffer by combining with hydrogen ions formed during precipitation of nickel sulfide to form $HSO_4^{-1}$, adding a slurry of finely divided nickel sulfide to said solution to provide a seed concentration of about 75 to 300 gpl, and then subjecting said solution to sulfide precipitation with $H_2S$ at a pressure of about 5 to 50 psig at a temperature of about 65° C to less than 100° C while vigorously agitating said solution until substantially complete sulfide precipitation of nickel obtains.

10. The method of claim 9, wherein the acid pH is adjusted by adding a neutralizing agent selected from the group consisting of MgO, Mg(OH)$_2$ and alkali metal hydroxides.

11. The method of claim 9, wherein the neutralizing agent is an oxide ore which yields a soluble inert sulfate as a neutralization product.

12. The method of claim 9, wherein the $H_2S$ is added to said solution under a pressure of about 10 to 25 psig and wherein the amount of nickel sulfide seed ranges from about 100 to 200 gpl.

13. A continuous process for efficiently precipitating nickel as nickel sulfide from an acidic nickel sulfate solution having a pH below 1.5 containing up to 15 gpl nickel and up to 5 gpl cobalt which comprises:

neutralizing said solution to a pH in the range of about 1.5 to 4 by adding a neutralizing agent that forms a soluble inert sulfate salt by reaction with free acid in said solution, the inert sulfate salt providing sulfate ions in an amount ranging from about 30 to 400 gpl in said solution, the sulfate ion formed behaving as an acid buffer by combining with hydrogen ions formed during precipitation of nickel sulfide to form $HSO_4^{-1}$, adding a slurry of finely divided nickel sulfide seed to said solution to provide a seed concentration of at least about 75 gpl, feeding said solution through a group of series-connected precipitation tanks starting with the first tank and feeding under pressure $H_2S$ to said tanks starting with the last tank and causing said $H_2S$ to flow from said last tank through said series-connected tanks to the first tank to effect precipitation of nickel sulfide in said tanks at a temperature ranging from about 65° C to less than 100° C while vigorously stirring said solution in each of the precipitation tanks and while said solution, together with said seed, is passed from the last tank to a flash drum, continuously removing $H_2S$ from said flash drum and passing it to an ejector and condenser system for recycle to the precipitation tanks, continuously passing precipitated nickel sulfide from the flash drum to a thickener, continuously elutriating the nickel sulfide collected in said thickener, recycling a portion of said elutriated nickel sulfide to fresh nickel solution as seed material to provide a seed concentration of at least about 75 gpl, and then recovering the remainder of said precipitated nickel sulfide as the end product.

14. The continuous method of claim 13, wherein the acid pH is adjusted by adding a neutralizing agent selected from the group consisting of MgO, Mg(OH)$_2$, and alkali metal hydroxides.

15. The method of claim 14, wherein the neutralizing agent is a magnesium oxide-containing ore.

16. The continuous method of claim 15, wherein the $H_2S$ is added to said solution under a pressure of about 5 to 50 psig.

17. The continuous method of claim 16, wherein the pH of said solution is adjusted over the range of about 2 to 3.5, wherein the $H_2S$ is added under a pressure of about 10 to 25 psig and wherein the amount of nickel sulfide seed in said solution ranges from about 75 to 300 gpl.

* * * * *